United States Patent Office 3,741,809
Patented June 26, 1973

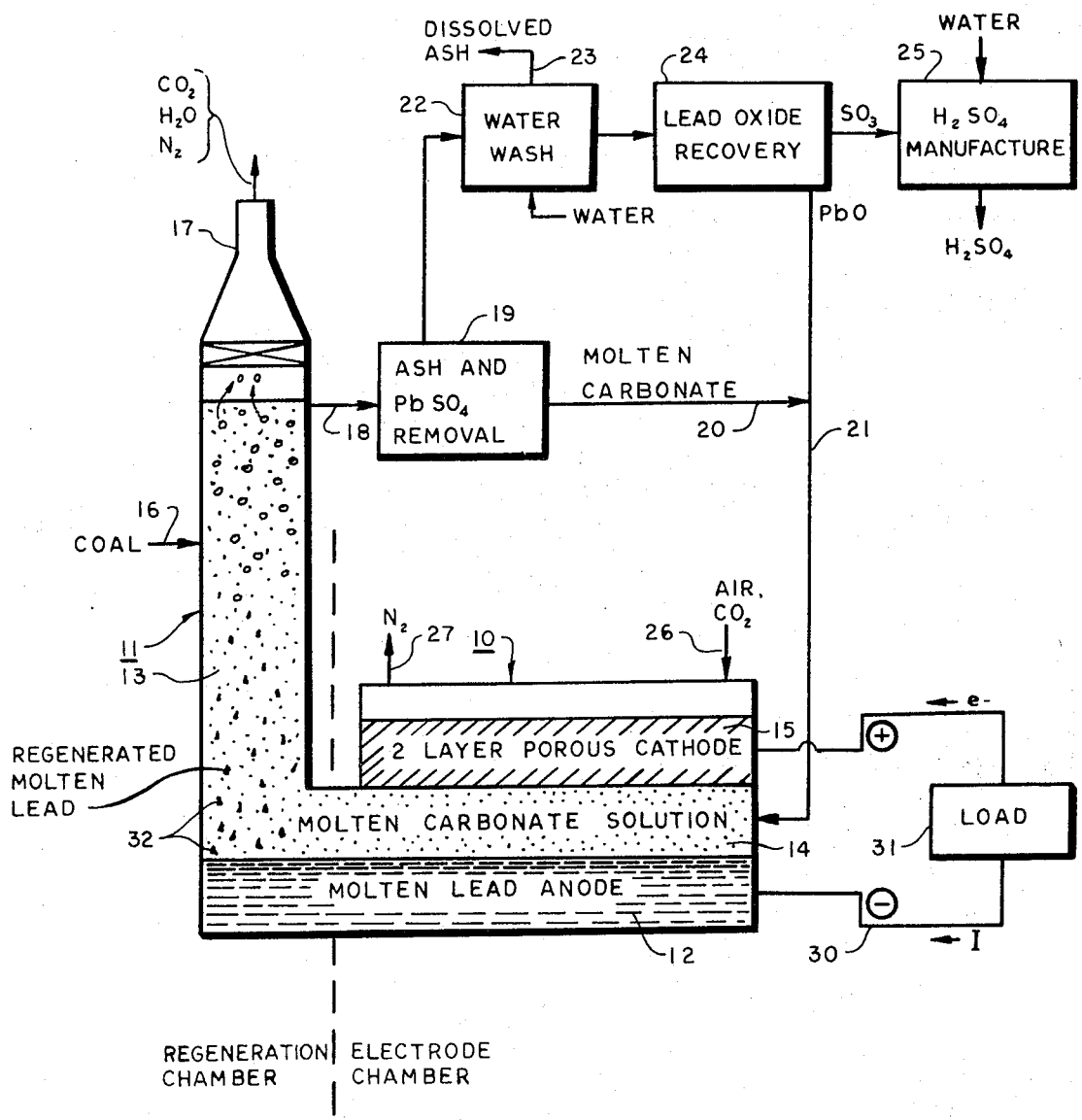

3,741,809
METHODS AND APPARATUS FOR THE POLLUTION-FREE GENERATION OF ELECTROCHEMICAL ENERGY
Michael Anbar, Palo Alto, Calif., assignor to Stanford Research Institute, Menlo Park, Calif.
Filed May 13, 1971, Ser. No. 142,980
Int. Cl. H01m 29/04
U.S. Cl. 136—86 A                4 Claims

ABSTRACT OF THE DISCLOSURE

Methods and apparatus for the pollution-free generation of electrochemical energy from coal, hydrocarbons or other carbonaceous fuels by a cyclic operation wherein a metal such as lead is oxidized in an electrochemical cell delivering electromotive force, with the resulting lead oxide then being reduced in a molten salt melt within a regeneration chamber by the addition thereto of the fuel. The reduced lead metal is then returned to the cell for the next cycle. A useful salt melt for employment in the regeneration chamber comprises admixed alkali metal carbonates, and preferably a melt of this character is employed both as the vehicle in which the lead is reduced by the fuel as well as for the electrolyte in the cell. Passage of the lead and lead oxide between the respective cell and regeneration zones can be continuous or intermittent. The total operation is carried out without formation of pollutant gases, and only $CO_2$, $N_2$ and $H_2O$ vapors are vented. Any sulfur present in the fuel is converted to lead sulfate and is removed from the salt, usually by treatment of a sidestream.

BACKGROUND OF THE INVENTION

The conversion of chemical energy to mechanical energy by combustion has two major drawbacks. The first relates to the low efficiency which is inherent in the Carnot cycle, while the second relates to the production of pollutant gases which are released to the atmosphere. The direct conversion of chemical energy to electrical energy, as practiced in a fuel cell, also has disadvantages. Thus, fuel cells have been successful only when hydrogen, carbon monoxide, hydrazine or a limited number of pure organic compounds are used as fuel, and to date there has been no successful large scale use of inexpensive fuels such as hydrocarbons or coal. Coal cannot be utilized as such in a fuel cell system without prior "gasification," i.e. conversion into low molecular weight products. This prerequisite, plus the large variety of products generated in the pyrolysis and hydration gasification processes, including pollutant gases, severely limits use of coal in fuel cells.

It is an object of this invention to provide a method whereby the energy present in widely available and inexpensive fuels such as coal, hydrocarbons and other carbonaceous materials can be recovered with a high degree of efficiency. A further object is to recover said energy without at the same time generating pollutant gases. The nature of still other objects of the invention will be apparent from a consideration of the descriptive portion to follow.

SUMMARY OF THE INVENTION

It has been discovered that the foregoing objects can be achieved by the practice of a cyclical method of operation in which a metal of the group consisting of lead, bismuth, and antimony is oxidized with oxygen in an electrolyte-containing electrochemcal cell wherein said metal is the anode and wherein oxygen, as supplied to the cell at the cathode, is reduced and thus generates the electromotive force. The resulting metal oxide is transferred into a regeneration chamber containing a molten salt vehicle in which said oxide is dissolved, and in said chamber the oxide is reduced back to the form of metal, which separates in molten form from the salt, by the addition of a carbonaceous fuel. Said fuel can be carbon, coal or a hydrocarbon, for example, or even an organic waste. The separated metal is then returned to the electrochemical cell to continue the cycle. In carrying out this method, heat generated by the exothermic reaction taking place in the cell is transferred to the molten salt vehicle of the reduction chamber to maintain the latter at the desired temperature, the metal oxide reduction reaction being slightly endothermic. The net reaction of the cycle is to oxidize C and H present in the fuel to carbon dioxide and water and to produce electrical power. If nitrogen is present in the fuel, it is released to the atmosphere as $N_2$. This method is not limited by the Carnot cycle and can achieve well over 50 percent efficiency in its conversion of chemical energy to electrical energy.

Of the metals lead, bismuth and antimony which can be employed in a practice of this invention, lead is preferred due to its relatively low cost as well as its thermodynamic efficiency and its relatively low melting temperature. Accordingly, while data will be presented hereinafter as to the other metals, the invention then for convenience will be hereinafter described as it relates to the use of a lead-lead oxide cycle of operation.

Reference has been above to the use of a molten salt medium in the reduction chamber and, as will be seen below, this same medium can be and preferably is employed as the electrolyte in the electrochemical cell. A variety of salts, or mixtures of salts, can be employed for this purpose, the important criteria being that the salt composition become molten at a temperature between about 350° and 1000° C., that the molten salt be relatively stable at the operating temperatures employed, that it be relatively inert to the lead or lead oxide, that it have a resistivity of the order of about 0.05 to 0.5 ohm-cm., and that it be non-corrosive. Various alkali metal salts, e.g., carbonates, for example, have these desired qualities, and a particularly preferred salt combination adapted for use in the present invention comprises a mixed sodium, potassium and lithium carbonate eutectic containing about 43.5 percent $Li_2CO_3$, 31.5 percent $Na_2CO_3$ and 25 percent $K_2CO_3$. This system has a melting point of about 390° C. Any tendency of the salts, notably $K_2CO_3$, to decompose at operating temperatures above about 400° C. is suppressed by the presence of carbon dioxide gas which is normally present in both the metal oxidation and the regeneration zones. In view of its highly desirable attributes, the said K-Li-Na carbonate eutectic mixture is that which will hereinafter be employed in describing the invention, said mixture being hereinafter referred to, for convenience, as the "molten salt" or more simply as the salt "melt."

In one of its aspects, the energy generating system of the present invention will consist of an electrochemical cell coupled in close, heat exchange proximity with a vessel which acts as the regeneration chamber, the cell being one having an oxygen-reducing cathode, a solid lead anode and, as the electrolyte, an alkaline aqueous solution in which —OH⁻ is the current carrying ion. The lead electrolyte will hang into this solution, thereby allowing lead oxide to be deposited at the bottom of the cell. This oxide will be continuously or intermittently removed by centrifugal separation, suction or other means and transferred into the regeneration chamber. The latter will consist of a vessel (usually adapted to be externally heated in periods of start-up operation) containing the molten salt into which the carbonaceous fuel is injected for admixture with the lead oxide. In the ensuing reaction, the lead metal which is formed will sink to the bottom, where it may be recovered, solidified by cooling, and fed anew into the electrochemical cell. As noted above, the cell and the regeneration chamber should be mounted in close proximity to one another so that advantage can be taken of the heat generated in the cell to supply that required by the somewhat endothermic reduction reaction taking place in said chamber. The overall oxidation-reduction reaction is exothermal by 26 kcal./mol of oxidized fuel when propane is employed, or 25 kcal./mol of oxidized fuel when carbon is used.

DESCRIPTION OF PREFERRED EMBODIMENTS

In the preferred embodiment of the invention, a common body of molten salt is employed both as the electrolyte in the electrochemical cell and as the vehicle in which reduction takes place in the regeneration chamber. In this embodiment, the salt is recirculated, preferably in a continuous fashion, between the electrode-containing cell and the regeneration chamber with part or all of the recirculating stream being treated for removal of any sulfates and ash which may build up therein as impurities. The electrochemical cell consists of an oxygen-reducing cathode, a pool of molten lead at the bottom of the cell which serves as the anode, and the intervening body of a molten salt electrolyte. Oxygen, usually in the form of air or of air admixed with carbon dioxide, is supplied to the cathode which can be a porous ceramic material coated on the electrolyte side with Ag or CuO which acts to catalyze formation of oxide ions ($O^{2-}$) or carbonate ions ($CO_3^{2-}$), depending on whether or not $CO_2$ is present in the gas feed to the cathode. These ions which form at the cathode then react with the lead anode to form lead oxide, carbon dioxide also being formed if carbonate ions are present. The lead oxide dissolves in the molten salt and is transported by the latter to the regeneration chamber.

The function of the regeneration chamber is to react added fuel with lead oxide to form molten lead and a pollutant-free stack gas. The carbonaceous fuels employed to form this function can be added to the molten salt in the regeneration chamber in either gaseous, liquid or solid form. For reasons of economy, however, coal is the preferred fuel material, and the process of this invention is adapted to "burn" coal without the generation of sulfur dioxide or oxides of nitrogen as gaseous emissions. When employing coal, the practice is to add the coal in finely pulverized form to the stream of circulating salt in the regeneration zone. Under appropriate temperature conditions, for example, 425°–500° C., the volatile matter present in the coal will be oxidized to $CO_2$, $N_2$ and $H_2O$. The coke formed will reduce the lead oxide to molten lead which will fall by gravity into a lead pool at the bottom of the regeneration chamber. Sulfur present in the coal will react with lead oxide to form lead sulfide which then dissolves in said molten lead and is returned therewith to the cell where it is oxidized to lead sulfate. This sulfate is substantially insoluble in the molten salt electrolyte.

For the purposes of the present description, coal may be considered to be a mixture of carbon and hydrogen along with minor amounts of carbon disulfide and ammonia, and thermodynamics calculated on that basis are close to real values for coal. The thermodynamic activity of lead oxide is assumed to be close to unity. The reactions to be considered as taking place in the regeneration zone, along with their thermodynamic parameters are as follows:

|  | $\Delta G°_{700}S$, kcal/mole | $\Delta H_{700}S$, kcal/mole |
|---|---|---|
| $PbO+C=Pb+CO$ | −6 | +26 |
| $PbO+CO=Pb+CO_2$ | −16 | −16 |
| $PbO+H_2=Pb+H_2O$ | −14 | −6 |
| $PbO+\frac{1}{2}CS_2=PbS+\frac{1}{2}CO_2$ | −36 | −28 |
| $PbO+\frac{1}{2}CS_2+\frac{1}{2}C=PbS+CO$ | −31 | −18 |
| $PbO+\frac{1}{3}NH_3=Pb+\frac{1}{6}N_2+H_2O$ | −18 | +2 |
| $SO_2+3Pb=PbS+PbO$ | −27 | −56 |

Since the free energy changes for the above reactions are all quite negative, the products expected are $CO_2$, $H_2O$, Pb, $N_2$, and all the sulfur in the form of PbS. The last reaction emphasizes the fact that $SO_2$ will not be formed under the conditions of the reactor.

The foregoing analysis has been made on the assumption that lead oxide is present as such in the carbonate salt melt. However, it is known that pure lead carbonate decomposes to the pure solid oxide at elevated temperatures. Also known is the fact that the partial pressure of $CO_2$ over lead oxide-molten alkali carbonate mixtures reaches one atmosphere at about 430° C. Accordingly, in this mixture the lead may behave either as the oxide or the carbonate. The free energy of formation of these two lead compounds is essentially the same, and no serious error can arise from the presumption that lead oxide is the important species.

In the electrode chamber, or electrochemical cell, the cathode reaction consists of a reduction of oxygen to oxide ion, or to carbonate ion when combined with $CO_2$. The oxide and/or carbonate ions then migrate to the anode under the electrochemical potential in the cell. The ratio of the ionic mobilities of oxide and carbonate determines which species is the important one to consider in the melt, and if the carbonate is important, then carbon dioxide should be added at the cathode along with oxygen (air). If the oxide is predominant, then the $CO_2$ need not be added at the cathode. In using air, the nitrogen gases supplied along with oxygen at the cathode are not taken up by the cell but are released therefrom as a non-pollutant vent stream.

The most significant reaction taking place at the anode is the oxidation of molten lead to the oxide (or carbonate). The combined electrode reactions can be written:

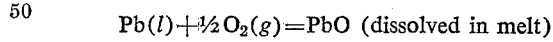

or

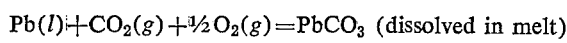

wherein the letter "*l*" represents lead in the liquid state and "*g*" represents gaseous components. At 700° K. (427° C.) the standard free energy changes ($\Delta G°_{700K}$) for these two reactions are essentially the same and are equal to −36 kcal. The open circuit cell voltage should then be 0.76 volt. The enthalpy change ($\Delta H_{700K}$) for the reactions is −55 kcal. Accordingly, the heat evolved in the cell when it operates reversible is 19 kcal. per mole of lead reacted. That heat is sufficient to compensate for the heat used in the reduction of the lead oxide and to balance operational heat losses.

The lead sulfide (impurity) dissolved in the lead will react at the anode to form sulfate according to the following equation:

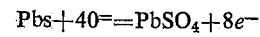

The overall reaction (anode plus cathode reactions)

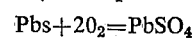

has a standard free energy change of −145 kcal. at 700° K., or an electrochemical potential of 0.79 volt. Since that potential is slightly larger than the lead oxidation potential, the reaction that forms the sulfate has a greater tendency to occur. Therefore, the sulfur will be converted to sulfate during cell operation and be transferred to the melt rather than being converted to $SO_2$ gas. This lead sulfate does not dissolve to any appreciable extent in the molten salt but is carried in suspension therein as the salt flows into the regeneration zone. It can be removed from the salt stream at any convenient point by filtering or settling out, the preferred procedure being to continuously withdraw a side stream of salt from the unit leaving the regeneration chamber so as to free the same of impurities.

In carrying out the present invention using a circulating stream of molten salt through the respective electrode and regeneration chambers, the flow rate of the melt across the molten lead anode should be maintained at a high enough level as to insure rapid removal of the lead oxide, lead sulfate and any carbon dioxide formed at the lead surface. This prevents the reaction taking place in the cell from being impeded. Further, the relative volume of the melt present at any time in the cell should be such as to be capable of readily dissolving the lead oxide as fast as it is formed. Progressively higher temperatures also favor enhanced lead oxide solubility in the melt. Hindrance of the reaction at the anode can be detected by a reduction in current generation, and the necessary salt flow rate and volume parameters to obtain maximum output from any given apparatus can thus be determined by making routine tests under varying operating conditions.

From a physical standpoint, the cathode employed in the cell is one which permits of the movement of gas but which resists flooding by the molten electrolyte. These criteria are met by the use of a 2-layer ceramic electrode having a coarse pore layer on the entrant gas side and a fine pore layer on the electrolyte side provided with an Ag or CuO catalytic facing. Cathode elements of this type have been developed for use in the Broers cell, and the technology developed in connection therewith is applicable to the present system.

However the present operation is carried out, the temperature of the molten salt employed in the regeneration zone (or in both the regeneration and the electrode-containing chambers, in the case of a recirculating salt system) is maintained within a range of from about 400° to about 1000° C. The particular temperatures employed will vary, depending on the composition of the salt and the temperatures required to fully vaporize the hydrocarbon components of the fuel and to effect dissolution of the lead oxide. Thus, the lowest practical temperature to employ for a given salt is one which is at least about 15° to 20° C. above its fusion temperature, while the upper limit on the temperature should be below that which would cause damage to the particular apparatus employed or to the components thereof. The temperature of the melt may be somewhat different from one portion of the apparatus to another, the temperatures prevailing in the regeneration zone, due to the endothermic nature of the process taking place therein, usually being somewhat lower than those in the exothermic electrochemical cell.

The invention will be more clearly understood by reference to the figure of the appended drawing which presents a schematic flow diagram of apparatus illustrating the invention in one embodiment thereof, the unit shown being one of the recirculating salt type wherein the exit from the electrochemical cell leads directly into the coal-fueled regeneration chamber. The liquid lead formed in this chamber falls back into the anode pool of the cell, while the salt leaves at an upper level in the chamber for purification and return to the entrant end of the cell. In this figure, various of the valves, pumps, filters, auxiliary heaters and by-product recovery apparatus, electrical fittings and instruments for controlling temperature, flow rate and the like have been omitted in the interests of clarity. The nature and arrangement of such omitted items will be obvious to those skilled in the art in the light of the persent teaching.

Referring more particularly to the drawing, there is shown a combined electrochemical cell and regeneration chamber structure wherein the cell is generally indicated at 10, with the regeneration chamber being shown at 11. A continuous body 12 of molten lead is supported at the base of the apparatus, said body extending the full width of the cell and also underlying a column 13 of molten salt in chamber 11. This salt column is continuous with a molten salt layer shown at 14 which serves as the electrolyte in cell 10, said layer filling the space between the lead (anode) 12 and a 2-layer porous cathode 15 having a CuO facing which is in contact with the upper surface of the molten salt layer 14.

Coal, preferably powdered or otherwise finely divided is fed through line 16 into chamber 11 for intimate admixture thereon with the molten salt column 13. As said coal is consumed in the regeneration chamber 11, wherein temperatures are maintained at about 400° to 550° C., the lead oxide present in the salt is reduced to (molten) lead. Carbon dioxide and nitrogen gases which are formed during the reaction (along with water vapor) are discharged from chamber 11 through stack 17, the presence of these gases in the salt column 13 serving to lower the density thereof and thereby causing the molten salt to be drawn out of cell 10 and up through chamber 11 for discharge through line 18. The material in line 18 passes to an ash and lead sulfate removal zone 19 wherein these components, which are insoluble in the molten salt, can readily be removed by filtration, settling or by other conventional means. The purified molten salt from zone 19 then returns by gravity through lines 20 and 21 to the entrant end of cell 10, thus keeping up a continuous flow of the molten salt through the respective cell, regeneration and purification zones.

Rather than treat the entire salt stream in purification zone 19, a side stream (not shown) could be so treated, thereby keeping the impurities in the overall circulating salt system at an acceptably low level.

The ash and lead sulfate removed in zone 19 can be carried to zone 22 where they are water-washed to separate the ash from the sulfate. The ash, which consists of sodium chloride and other salts, is essentially water soluble, and the aqueous ash solution is taken off from zone 22 through line 23. The residual water-insoluble lead sulfate is then taken to a lead oxide recovery zone 24 where it is decomposed into sulfur trioxide and lead oxide. The lead oxide returns to the cell (along with salt recycle) through line 21, while the sulfur trioxide passes to zone 25 for conversion to sulfuric acid by reaction with water.

Oxygen (air) and carbon dioxide are admitted through line 26 into the space above cathode 15, the nitrogen in the entrant gases being vented through a line 27. The admitted oxygen and carbon dioxide, in the form of oxide or carbonate ions, readily pass through the electrolyte salt layer 14 (which in the case of Na-K-Li carbonate eutectic has a resistivity of 0.1 ohm-cm.) to the anode where they react to form lead oxide and generate a current in electrical line 30 across a load 31. Lead sulfide, present in solution in the lead anode metal, is oxidized to lead sulfate by the oxide and carbonate ions.

The moving salt in the cell rapidly and continuously dissolves the lead oxide which forms on the lead surface. It also acts to sweep away the lead sulfate formed at the lead surface which, though substantially insoluble in the salt, is carried along in suspension therein. Lead sulfide formed within the salt column 13 in chamber 11 on addition of a sulfur-containing coal or other fuel, dissolves in the molten bits of lead 32 shown as falling downwardly in column 13 into the lead anode pool 12.

The following examples illustrate the invention but are not to be construed as limiting the same.

Example 1

A mixture of 7 g. of a eutectic salt mixture containing 43.5 percent $LiCO_3$, 31.5 percent $Na_2CO_3$ and 25 percent $K_2CO_3$, along with 0.5 g. Pbo and 0.03 g. finely divided carbon, is placed in a crucible which, in turn, is placed in a quartz tube in a furnace. The tube is sealed at one end and stoppered at the other. Tubes for nitrogen gas inlet and outlet are provided, and provision is made to bubble the exit gas from the quartz tube through a solution of barium hydroxide to monitor the evolution of carbon dioxide. The temperature of the tube is then raised to 550° C. and maintained at this temperture for an hour, with clouding of the barium hydroxide being noted at about 450° C. On examining the contents of the crucible at the conclusion of the run it is observed that the lead oxide has been converted to free lead.

Example 2

A battery is constructed as follows: A 1-cm.-deep layer of Pb metal is placed in the bottom of a 2 x 20 cm. Pyrex test tube and a wire is run from the lead pool through a Pyrex glass tube to serve as insulator. The lead pool serves as the anode of the cell. For the cathode, a fritted glass gas bubbler is wrapped with silverplated copper wire and mounted about 2 cm. above the top of the Pb pool. The space between the lead and the cathode is then filled with the eutectic salt mixture of Example 1, the cathode actually dipping somewhat into said mixture. The bubbler is then connected to an oxygen line and a thermocouple is mounted in the eutectic to monitor salt temperature. The cell is now placed in a furnace, with the anode and cathode leads being connected to a voltmeter, milliammeter and resistance box. The cell temperature is now raised to 500° C. and oxygen is bubbled at a slow rate through the molten carbonate. At very high resistance a voltage of 0.48 v. is otbained which is fairly steady, though fluctuating somewhat with the bubbling. The resistance is then varied from 10K ohm, to 150 ohm, to 15 ohm, and the voltage-current values observed at these resistance levels are 0.46 v. and 0.05 mamp., 0.41 v. and 2.4 mamp., and 0.35 v. and 8.5 mamp., respectively.

The rate at which the fuel is added to the regeneration zone can be varied within relatively narrow limits from the stoichiometrically calculated values. Preferably, however, the equilibrium established between the rate of fuel (carbon) addition and the movement of lead oxide into the regeneration chamber is such that some unreduced lead oxide will be present in the molten salt effluent stream from the regeneration chamber. This method minimizes or eliminates altogether any build-up of unreacted coke particles in said effluent stream.

The apparatus can be brought to operating temperatures by any convenient heating means including gas-fired heaters, induction heaters, or the like. When not generating current, the salt in the sytsem can be kept in the molten state by mechanically pumping the same through the circuit, with a appropriate portion of the unit being externally heated to maintain system temperatures.

Of the three feasible systems, namely lead, antimony and bismuth, the Pb-PbO system operated at 427° C., has the highest voltage (0.76 v.), lowest metal cost (3¢/ Faraday) and highest value of maximum energy conversion effiicency (0.74 for methane and 0.76 for solid carbon). The $Bi-Bi_2O_3$ system at 427° C. has a lower voltage (0.67 v.), higher cost (93¢/Faraday), and lower maximium energy conversion efficiency (0.64 for $CH_4$, 0.65 for carbon). The $Sb-Sb_2O_4$ system operated at 677° C. (because of the higher melting point of Sb (630° C.) has a voltage comparable to that of Bi (0.68 v.), the cost is higher than that of lead (6¢/Faraday), and the maximum efficiency of energy converison is 0.66 for methane and carbon. Lead-lead oxide is, therefore, the system of choice both in the aqueous and non-aqueous systems.

What is claimed is:

1. A cyclic method of generating electromotive force from a solid carbonaceous fuel which comprises oxidizing a molten metal of the group consisting of lead, antimony and bismuth with oxygen in a molten salt electrolyte maintained, at a temperature above the melting point of said metal, in an electrochemical cell wherein said metal is the anode and wherein oxygen, as supplied to the cell at the cathode, is reduced and thus generates electromotive force; transferring the resulting metal oxide into a regeneration chamber containing a molten salt having the same composition as that in said electrochemical cell, said salt being recirculated between the cell and the regeneration chamber and acting to effect the transfer of the metal oxide to said chamber and to transfer heat generated in the cell to the chamber; adding a solid carbonaceous fuel to the metal oxide-containing molten salt in the regeneration chamber whereby said oxide is reduced to molten metal which separates out and whereby any sulfur and nitrogen present in the fuel are converted to a sulfate of the anode metal and to free nitrogen, respectively, the gases emitted from the regeneration chamber consisting essentially of carbon dioxide and nitrogen together with water vapor; separating the said sulfate; and returning the separated molten metal to the electrochemical cell to continue the cycle.

2. The process of claim 1 wherein the metal is lead and the salt is a eutectic mixture of the carbonates of sodium, potassium and lithium, and wherein a mixture of added carbon dioxide and air is supplied to the cell cathode.

3. Apparatus for the continuous generation of electromotive force from a carbonaceous fuel which comprises, an electrochemical cell having a porous, gas-conductive cathode effective to reduce oxygen to oxide ion and, spaced therefrom by a molten salt electrolyte, a supported molten lead anode; means for continuously introducing an oxygen-containing gas at said cathode for passage therethrough into the electrolyte; a regeneration chamber mounted above said cell and communicating therewith, said chamber being adapted to receive (1) a continuously up-flowing stream of said electrolyte containing dissolved lead oxide and (2) a continuous supply of carbonaceous fuel for admixture with said stream to reduce the lead oxide therein to molten lead which flows downwardly, as formed, through the stream for admixture with the anodic molten lead in the cell; a vent leading from an upper part of the regeneration chamber, above the level of the electrolyte therein, for release of reaction product gases; an electrolytle return conduit communicating with an upper portion of said regeneration chamber adapted to continuously receive the electrolyte as reduction of lead oxide reaches the desired level and to return the electrolyte to the cell; and terminals connected with the anode and cathode of the cell adapted for connection across a load.

4. The apparatus of claim 3 which includes means for removing ash, lead sulfate and other insoluble materials present in electrolyte leaving the regeneration chamber.

References Cited

UNITED STATES PATENTS

| | | | |
|---|---|---|---|
| 3,374,120 | 3/1968 | Lawson | 136—86 A |
| 2,921,110 | 1/1960 | Crowley et al. | 136—86 A |
| 3,100,163 | 8/1963 | Lyons, Jr. | 136—86 A |
| 3,271,197 | 9/1966 | Lyons, Jr. | 136—86 A |
| 3,316,124 | 4/1967 | Kronenberg | 136—122 |
| 3,530,006 | 9/1970 | Makishina et al. | 136—86 D |

OTHER REFERENCES

| | | | |
|---|---|---|---|
| 8,906 | 1896 | Great Britain | 136—84 |

ALLEN B. CURTIS, Primary Examiner

U.S. Cl. X.R.

136—86 C